(12) United States Patent
Weiss et al.

(10) Patent No.: US 9,291,263 B2
(45) Date of Patent: Mar. 22, 2016

(54) DIAPHRAGM BELLOWS PRODUCED FROM PROFILED METAL STRIP

(75) Inventors: Matthias Weiss, Hilchenbach (DE);
Karl-Heinz Münker, Hilchenbach (DE);
Dietmar Baumhoff, Olpe (DE);
Andreas Gerhard, Wenden (DE);
Karsten Schenk, Schwalmstadt (DE);
Michael Henkelmann, Hilchenbach (DE); Oliver Selter, Finnentrop (DE);
Stefan Hauk, Hilchenbach (DE)

(73) Assignee: WESTFALIA METALLSCHLAUCHTECHNIK GMBH & CO. KG, Hilchenbach (DE)

( * ) Notice: Subject to any disclaimer, the term of this patent is extended or adjusted under 35 U.S.C. 154(b) by 762 days.

(21) Appl. No.: 13/302,488

(22) Filed: Nov. 22, 2011

(65) Prior Publication Data

US 2012/0125192 A1    May 24, 2012

(30) Foreign Application Priority Data

Nov. 23, 2010  (DE) .......................... 10 2010 060 749
Aug. 31, 2011  (DE) .......................... 10 2011 053 131

(51) Int. Cl.
*F16J 3/04*   (2006.01)

(52) U.S. Cl.
CPC ............ *F16J 3/047* (2013.01); *Y10T 29/49877* (2015.01); *Y10T 428/12326* (2015.01)

(58) Field of Classification Search
CPC ............... F16J 3/04; F16J 3/047; F16L 11/16;
F16L 11/24; B23K 33/002

USPC ................ 92/47; 138/122, 134; 403/271
See application file for complete search history.

(56) References Cited

U.S. PATENT DOCUMENTS

| 4,758,704 | A  | * | 7/1988  | Kogel ....................... 219/121.64 |
| 6,346,160 | B1 | * | 2/2002  | Puppin ............................ 156/88 |
| 7,571,745 | B2 |   | 8/2009  | Baumhoff et al. |
| 7,748,749 | B2 |   | 7/2010  | Weiss et al. |
| 2006/0278291 | A1 | * | 12/2006 | Baumhoff et al. ............. 138/135 |
| 2008/0041482 | A1 |   | 2/2008  | Weiss et al. |
| 2008/0245435 | A1 |   | 10/2008 | Weiss et al. |
| 2008/0264509 | A1 | * | 10/2008 | Weiss et al. ................... 138/122 |
| 2010/0007138 | A1 |   | 1/2010  | Weiss et al. |
| 2011/0209790 | A1 |   | 9/2011  | Weiss et al. |
| 2011/0232796 | A1 |   | 9/2011  | Weiss et al. |

FOREIGN PATENT DOCUMENTS

| DE | 10 2008 001 297 A1 | 10/2008 |
| EP | 0200997 A2 * | 11/1986 ............ B23K 26/00 |
| FR | 1 038 160 A | 5/1953 |
| GB | 268 345 A | 1/1928 |
| JP | 1 176 857 A | 7/1989 |

\* cited by examiner

*Primary Examiner* — Dwayne J White
*Assistant Examiner* — Matthew Wiblin
(74) *Attorney, Agent, or Firm* — Henry M. Feiereisen LLC

(57) ABSTRACT

A profiled metal strip for a diaphragm bellows is made from a strip material having at least one border which is subjected to reverse bending. Such a metal strip is wound to produce a diaphragm bellows, with abutting borders of neighboring turns being connected with one another by a material joint, such as a welding seam.

20 Claims, 4 Drawing Sheets

DIAPHRAGM BELLOWS PRODUCED FROM PROFILED METAL STRIP

CROSS-REFERENCES TO RELATED APPLICATIONS

This application claims the priorities of German Patent Applications, Serial Nos. 10 2010 060 749.5, filed Nov. 23, 2010, and 10 2011 053 131.9, filed Aug. 31, 2011, pursuant to 35 U.S.C. 119(a)-(d), the contents of which are incorporated herein by reference in its entirety as if fully set forth herein.

BACKGROUND OF THE INVENTION

The present invention relates, in general, to the field of diaphragm bellows.

The following discussion of related art is provided to assist the reader in understanding the advantages of the invention, and is not to be construed as an admission that this related art is prior art to this invention.

Published U.S. patent document 2008/0264509 discloses a diaphragm bellows which includes a spiral-wound, pre-profiled metal strip having neighboring turns which are connected by a continuous welding seam in an area of an outer diameter or inner diameter of the metal strip. Neighboring flanks of the metal strip enter a region of the welding seam at an angle of less than 60°

It would be desirable and advantageous to provide an improved diaphragm bellows to obviate prior art shortcomings and to attain a longer service life.

SUMMARY OF THE INVENTION

According to one aspect of the present invention, a profiled metal strip for a diaphragm bellows is made from a strip material having at least one border which is subjected to reverse bending.

To ensure clarity, it is necessary to establish the definition of several important terms and expressions that will be used throughout this disclosure.

The term "metal strip" is used here in a generic sense and relates to any body of metal which is dimensioned in longitudinal direction substantially greater (virtually any length or infinite length) than in a transverse direction perpendicular thereto.

The term "profiled" in the context of the metal strip relates to a cross section which in transverse direction through the metal body has a predefined shape ("profile") which typically deviates from a simple straight line. Although not mandatory, this shape may be the same along the entire longitudinal extension of the metal strip.

The term "reverse bending" relates to a turning of the strip material by an angle of about 180°.

The term "border" relates to a direction in longitudinal direction of the strip material.

Examples of materials for use as a metal strip may include temperature-stable and corrosion-resistant metals, like, e.g., special steel.

As a result of a reverse bending of the strip material in the border area, a doubling of material is realized. Suitably, the reverse bending is limited to the border area, i.e. the reverse bending is not intended to extend in transverse direction across the entire width of the metal strip. In longitudinal direction, the reverse bending suitably extends along the entire longitudinal edge of the metal strip.

According to another aspect of the present invention, a diaphragm bellows includes at least one wound pre-profiled metal strip made from a strip material and having neighboring turns which are connected, at least in one area, by a material joint at their borders, wherein at least one border of the strip material of the metal strip is subjected to reverse bending. The profiled metal strip used here is of a type as described above and includes at least one border subjected to a reverse bending of the strip material.

According to still another aspect of the present invention, a method of making a diaphragm bellows includes the steps of producing at least one pre-profiled metal strip from a strip material with at least one border which is subjected to reverse bending, winding the metal strip to produce a spiral-shaped structure, and joining adjacent borders of neighboring turns of the strip material by a material joint.

According to another advantageous feature of the present invention, the winding step may include the optional incorporation of normal metal strips, i.e. metal strips that are absent of at least one border subjected to a reverse bending of the strip material, in order to produce a spiral-shaped structure.

Examples of a material joint include soldering or welding.

Tests have shown that the presence of a reverse bending in accordance with the present invention can substantially prolong the service life of a diaphragm bellows produced according to the present invention.

While it is generally adequate to subject a (longitudinal) border of the metal strip to a reverse bending, it is currently preferred to subject both borders of the metal strip to reverse bending. In this way, adjacent turns connected by a material joint provide the diaphragm bellows at both borders with a material doubling. This further enhances the service life of the diaphragm bellows.

According to another advantageous feature of the present invention, the metal strip may be profiled in cross section so as to have a constriction or bulge. For example, the cross section of the metal strip may be U-shaped, V-shaped, W-shaped, or by combinations thereof. U-shaped and V-shaped cross sections have hereby a single constriction (or bulge), whereas W-shaped or combinations of cross sections may have two or more such constrictions (or bulges). Cross sections with several constrictions have the benefit that the produced diaphragm bellows is easier to produce while retaining the same flexibility because the provision of material joints can be spread at greater axial distances from one another.

According to another advantageous feature of the present invention, the borders of neighboring turns can extend in substantial parallel relationship, when viewed in radial direction. As a result, the borders bear flatly upon one another at the joining zone, thereby reducing stress on the joining zone.

According to another advantageous feature of the present invention, the borders of neighboring turns can extend in substantial perpendicular relationship to a winding axis, when viewed in radial direction. The winding axis relates hereby to the axis of the diaphragm bellows. As a result of this configuration, the provision of metal strips with symmetric cross sectional profiles becomes possible.

When producing a diaphragm bellows with a metal strip as described above, the borders of neighboring turns abut one another in the joining zone, with at least one of the borders being subjected to reverse bending. This reverse bending may be provided either on the side of the contact surface to the adjacent winding or may face away from the contact surface of neighboring turns. Currently preferred is the latter option.

When winding a pre-profiled metal strip to form a diaphragm bellows, the borders of neighboring turns may theoretically lie at each radial position in relation to the winding axis. In particular, the joined borders of neighboring turns may lie on the inner radius of the diaphragm bellows. Currently preferred is a positioning of the borders of neighboring turns to abut one another at an outer radius of the diaphragm bellows.

According to another advantageous feature of the present invention, the reverse bending defines a bending line which can lie in a radially outermost extension of the diaphragm bellows. This is beneficial because any contact of the diaphragm bellows from outside occurs substantially on the bending line so that a contact with sharp edges or the like is avoided.

Normally, it is sufficient to join neighboring turns of the diaphragm bellows locally in some areas only by a material joint. Currently preferred is however a connection of neighboring turns by a material joint end-to-end, for example by way of a continuous welding seam. As a result, an overall gastight diaphragm bellows can be produced.

According to another advantageous feature of the present invention, the center of the afore-mentioned welding seam may be distanced from the outer diameter and from the inner diameter of the diaphragm bellows in radial direction by at least roughly 0.5 mm. Currently preferred is a distance of at least roughly 1 mm. The radial position of the welding seam can then vary without breaching the seam so that the welding process is simplified.

Further possible configurations of a pre-profiled metal strip according to the present invention or a diaphragm bellows according to the present invention are described in US 2008/0264509 which is incorporated in its entirety by reference to the extent it does not conflict with the disclosure herein.

For example, the turns of the diaphragm bellows may be connected by a welding seam which is configured as a flat welding seam along an end face and arranged on the outer diameter or the inner diameter.

When a V-shaped profile of the metal strip is involved, the bending radius within the crease line of the profile is typically less than 0.8 mm. Currently preferred is a bending radius of less than 0.1 mm.

Advantageously, the diaphragm bellows may be configured such that the ratio of the axial dimension of its wave crests in relation to the axial dimension of its wave valleys is less than 1, preferably less than 0.9. Currently preferred is a ratio of 0.85. The axial dimensions are hereby measured from the central radius between inner radius and outer radius, when the diaphragm bellows is in a relaxed state The metal strip may have a cross section with corrugated flanks. Suitably, the corrugation for both flanks extends in the same direction to enable the flanks to substantially bear upon one another without interstices, when the diaphragm bellows is compressed. The corrugation provides the flanks with added flexibility.

As the reference to the term "bellows" would indicate, a diaphragm bellows according to the present invention has a land height, i.e. the difference between maximum outer radius and minimum inner radius, which is fairly great. Typically, the land height is in a range from 5% to 30% of the inner diameter of the bellows. In relation to the material thickness of the metal strip, the land height is at least ten times to twenty times a material thickness of the metal strip.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
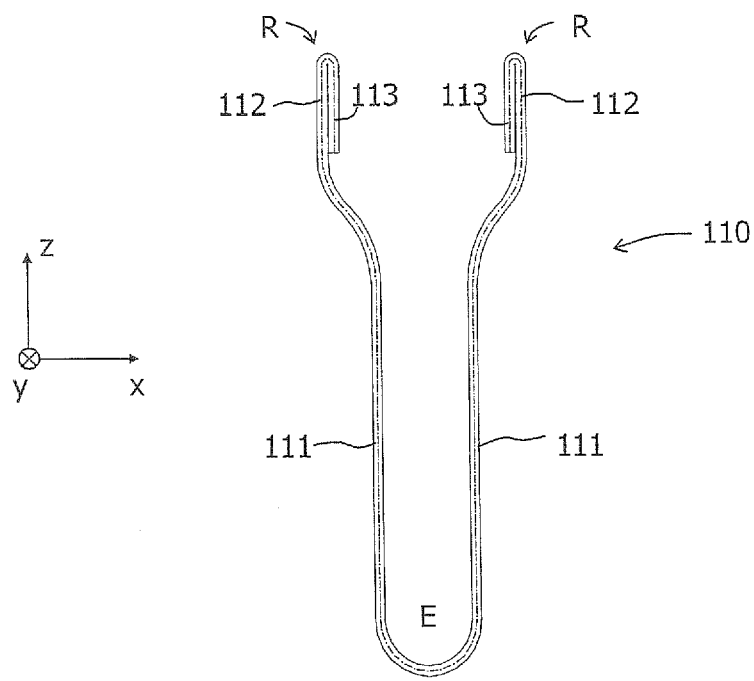
FIG. 1 is a cross sectional profile of a first embodiment of a metal strip according to the present invention in the shape of a U.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional profile of a first embodiment of a metal strip according to the present invention in the shape of a U, generally designated by reference numeral 110 and made from a material strip. The metal strip 110 extends "indefinite" in a y direction perpendicular to the drawing plane and has a same cross sectional profile throughout this "longitudinal direction". It will be appreciated by persons skilled in the art that the provision of a same cross sectional profile is not necessarily required as, of course, metal strips with varying cross sectional profiles may be applicable as well, without departing from the spirit of the present invention.

The metal strip 110 has a substantially U-shaped configuration and is configured symmetrical in transverse direction (x direction). The metal strip 110 has two legs 111 which are joined together by a bend forming a constriction E.

The U-shape of the metal strip 110 is slightly widened at its borders R. The borders R are formed by a substantially radially (i.e. in z direction) extending contact web 112 having a radial prolongation which is bent by 180° to define a reverse bending 113 of the material strip. As a result of the reverse bending 113, a material doubling is established in a region of the border R.

As shown in FIG. 1, both borders R of the metal strip 110 are preferably configured the same as mirror images of one another, i.e. each of both borders R is provided with a reverse bending 113. Of course, it is conceivable within the scope of the present invention to provide only one of the borders R with a reverse bending 113 and/or the metal strip may have sections which along the longitudinal extension (y direction) may have a reverse bending 113.

In the non-limiting example of FIG. 1, the reverse bending 113 is position on the inside, i.e. on the inner side of the contact web 112. "Inner" relates hereby to the U shape. It is, of course, also conceivable to position the reverse bending on the outer side.

Figure 2:
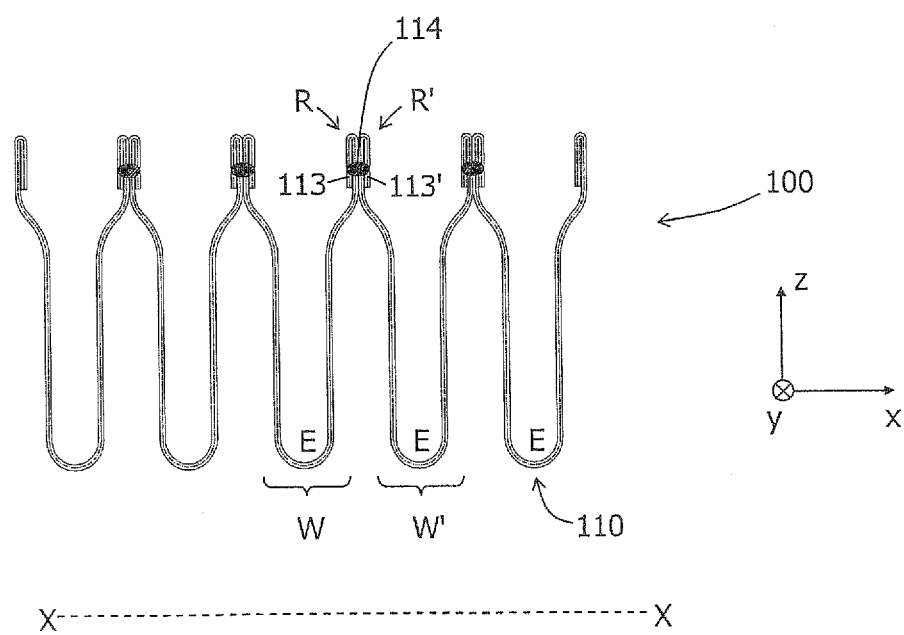
FIG. 2 is a cross sectional view of a wall of a diaphragm bellows produced with the metal strip of FIG. 1.

FIG. 2 shows a cross sectional view of a wall of a diaphragm bellows, generally designated by reference numeral 100 and produced by spiral-winding the metal strip 110. The winding axis or axis X of the diaphragm bellows 100 is also indicated in FIG. 2 although not true to size, with the opposing wall of the diaphragm bellows 100 being envisioned as a mirror image to this axis X. Neighboring turns W, W' of the metal strip 110 abut one another along their borders R, R' at the outer radius. As a result of the afore-described profile, the borders R, R' touch each other with the contact webs 112 extending perpendicular to the winding axis X, when viewed in radial direction. As they are positioned on the inside of the U section, the reverse bendings 113, 113' cannot come into contact with the adjacent turns, respectively.

In order to permanently fix the winding structure and to render the diaphragm bellows 100 gastight, the borders R, R' of neighboring turns W, W' are joined together by a continuous welding seam 114.

The finished diaphragm bellows 100 has a spiral-shaped wrap-around radial constriction E to impart the desired flexibility. Furthermore, the reverse bendings 113, 113' provide the diaphragm bellows 100 with a long service life under mechanical stress, for example when used as decoupling element in the exhaust tract of a motor vehicle.

Figure 3:
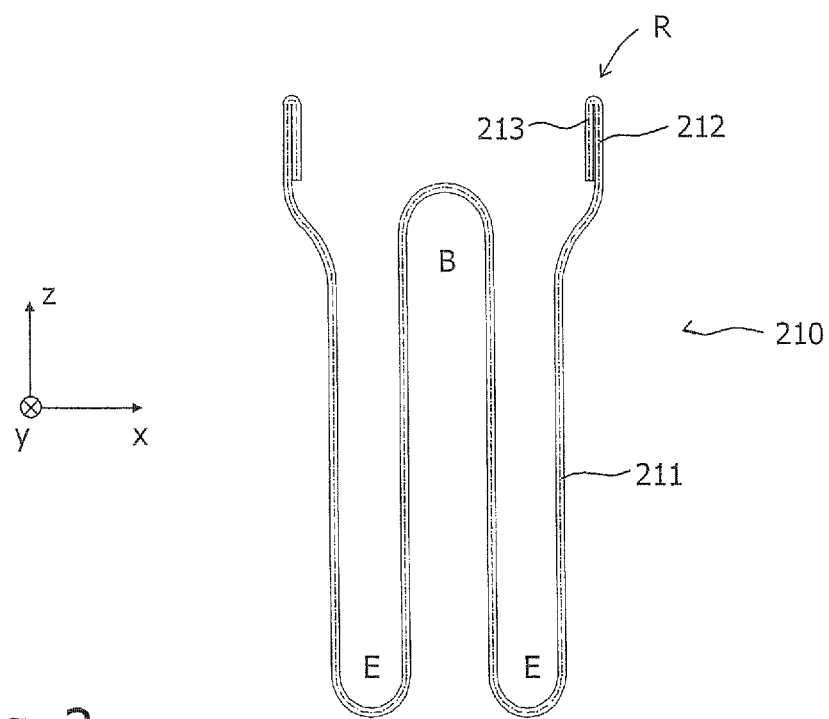
FIG. 3 is a cross sectional profile of a second embodiment of a metal strip according to the present invention in the shape of a W.

Turning now to FIG. 3, there is shown a cross sectional profile of a second embodiment of a metal strip according to the present invention in the shape of a W, generally designated by reference numeral 210. In the following description, parts corresponding with those in FIG. 1 will be identified, where appropriate for the understanding of the invention, by corresponding reference numerals, each increased by "100". The description below will center on the differences between the embodiments. In this embodiment, provision is made for two radial constrictions E which are connected to one another by an outer bulge B. The borders R of the metal strip 210 are configured in a similar manner as the borders R of metal strip 110 so that further description is omitted for the sake of simplicity.

Figure 4:
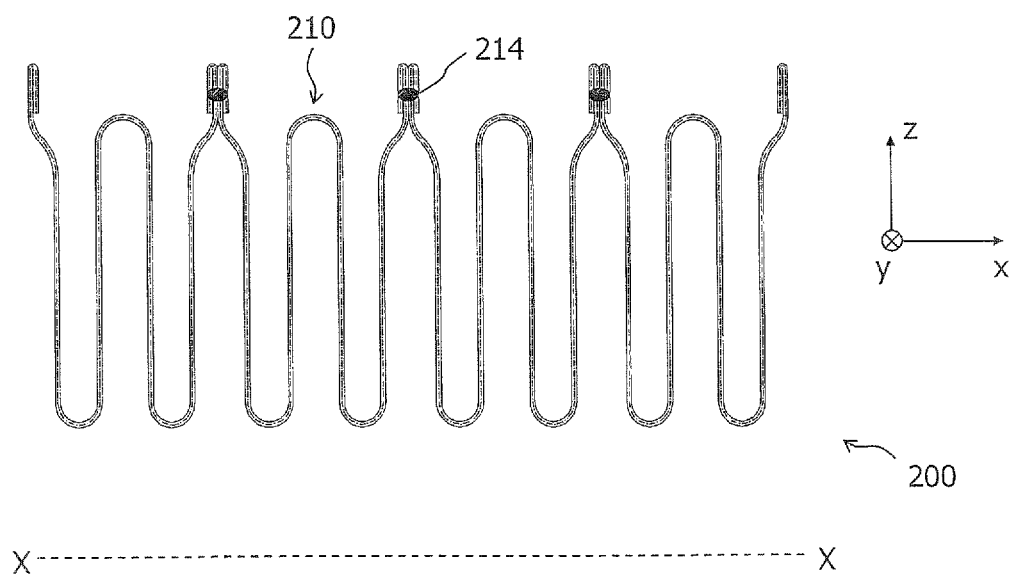
FIG. 4 is a cross sectional view of a wall of a diaphragm bellows produced with the metal strip of FIG. 3.

FIG. 4 shows a cross sectional view of a wall of a diaphragm bellows produced with the metal strip 210 through winding and generally designated by reference numeral 200. The description with respect to FIG. 2 is also applicable here. A benefit of the W-shaped metal strip 210 resides in the simplified implementation of the welding seam 214 when the number of constrictions E per length unit is the same because the welding seam 214 extends at a greater axial pitch (roughly twice as great as in FIG. 2).

Although the drawings show the production of a diaphragm bellows from a single metal strip, it is, of course, also conceivable to make a diaphragm bellows according to the invention from two or more, preferably differently profiled, metal strips, e.g. metal strips 110 and 210.

Figure 5:
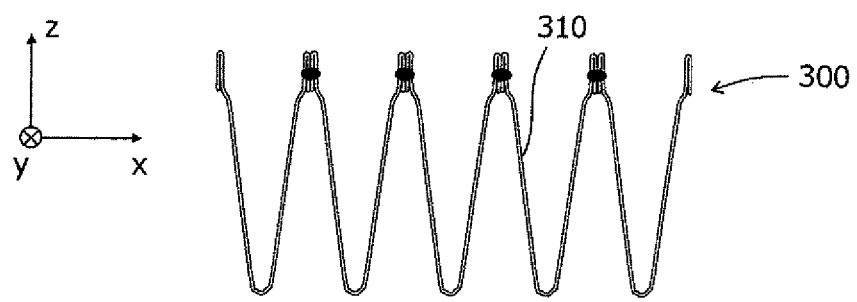
FIG. 5 is a cross sectional view of a diaphragm bellows produced from a metal strip according to the present invention in the shape of V.
Figure 6:
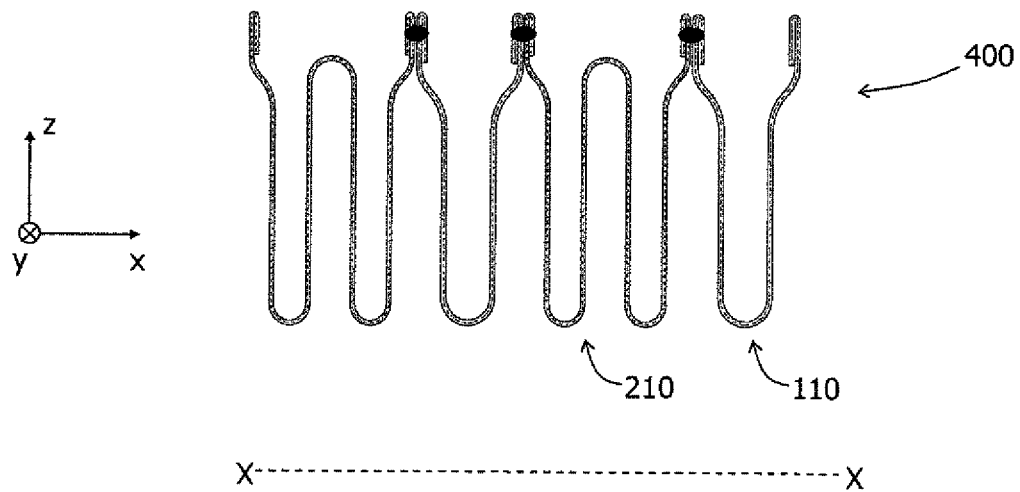
FIG. 6 is a cross sectional view of a wall of a diaphragm bellows produced from a metal strip according to the present invention in the shape of alternating W and U.
Figure 7:
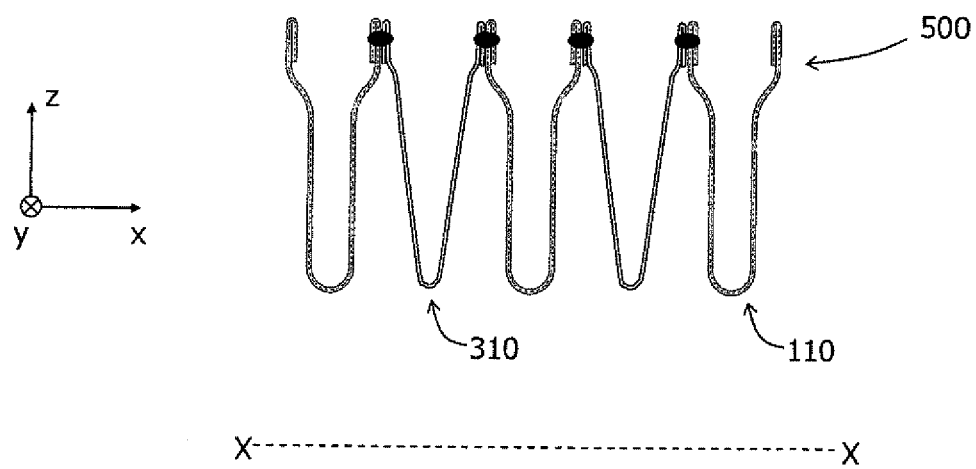
FIG.7 is a cross sectional view of a wall of a diaphragm bellows produced from a metal strip according to the present invention in the shape of alternating U and V.
Figure 8:
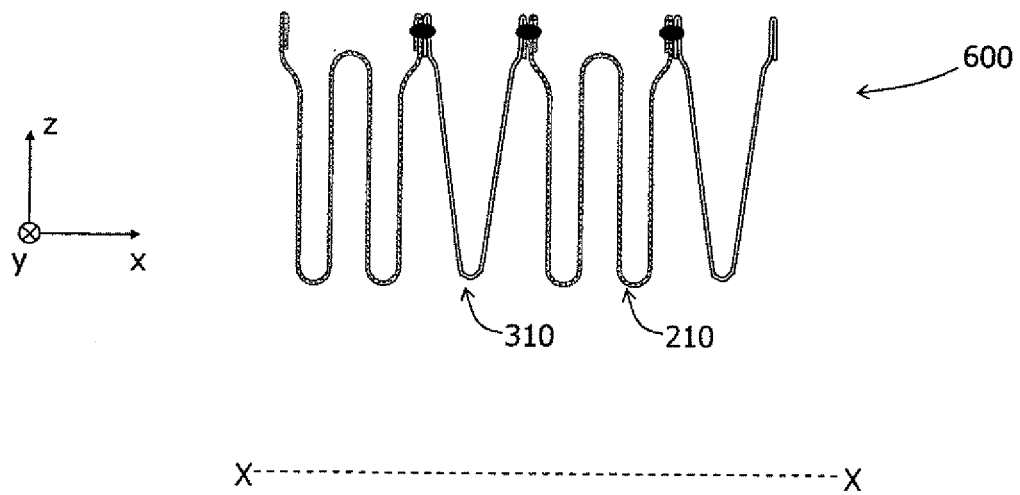
FIG.8 is a cross sectional view of a wall of a diaphragm bellows produced from a metal strip according to the present invention in the shape of alternating W and V.

Diaphragm bellows produced from metal strips of further shapes are shown in FIGS. 5-8. The diaphragm bellows 300 of FIG. 5 is produced from metal strip 310 having a V shape. The diaphragm bellows 400 of FIG. 6 is produced from alternating metal strips 110 having a U shape and metal strips 210 having a W shape. The diaphragm bellows 500 of FIG. 7 is produced from alternating metal strips 110 having a U shape and metal strips 310 having a V shape. The diaphragm bellows shown in FIG. 8 is produced from alternating metal strips 210 having a W shape and metal strips 310 having a V shape.

As can be seen from the drawings, according to the present invention the borders R, R', at least one which is subjected to reverse bending, do not overlap in an axial direction, or in other words in direction of the winding axis X.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A diaphragm bellows having a winding axis, comprising at least one wound pre-profiled metal strip made from a strip material and having neighboring turns which are connected, at least in one area at their borders, wherein at least one border of the strip material of the metal strip is subjected to reverse bending by turning the strip material by an angle of about 180 degrees and to include one contact web and one reverse web which are in abutment with each other and thereby provide doubling of the strip material, and wherein the borders of the neighboring turns do not overlap in the axial direction of the winding axis, each said border of the neighboring turns includes said contact web and said reverse web, and an abutment exists between the contact webs of the neighboring turns, or an abutment exists between the contact web of one of the neighboring turns and the reverse web of another one of the neighboring turns, via which the neighboring turns are connected with one another.

2. The diaphragm bellows of claim 1, wherein the metal strip has a cross section selected from the group consisting of U-shape, V-shape, W-shape, and combinations of at least two of the shapes.

3. The diaphragm bellows of claim 1, wherein the borders of the neighboring turns extend in substantial parallel relationship, when viewed in radial direction.

4. The diaphragm bellows of claim 1, wherein the borders of the neighboring turns extend in substantial perpendicular relationship to the winding axis, when viewed in radial direction.

5. The diaphragm bellows of claim 1, wherein the reverse bending of the metal strip faces away from a contact surface of the neighboring turns.

6. The diaphragm bellows of claim 1, wherein the borders of the neighboring turns, connected with one another, lie at an outer radius of the diaphragm bellows.

7. The diaphragm bellows of claim 1, wherein the reverse bending defines a bending line which lies in a radially outermost extension of the diaphragm bellows.

8. The diaphragm bellows of claim 1, wherein the neighboring turns are connected end-to-end.

9. The diaphragm bellows of claim 8, wherein the neighboring turns are connected by a welding seam.

10. A method of making a diaphragm bellows having a winding axis, comprising the steps of:
producing at least one pre-profiled metal strip from a strip material with at least one border which is subjected to reverse bending by turning the strip material by an angle of about 180 degrees so that the at least one border includes one contact web and one reverse web and thereby doubles the strip material, and wherein the borders of neighboring turns do not overlap;
winding the metal strip to produce a spiral-shaped structure thereby forming the neighboring turns; and joining the borders of the neighboring turns of the structure so that they do not overlap each other in an axial direction of the winding axis and each said border of the neighboring turns includes said contact web and said reverse web, and an abutment exists between the contact webs of the neighboring turns, or an abutment exists between the contact web of one of the neighboring turns and the reverse web of another one of the neighboring turns, via which the neighboring turns are connected with one another.

11. The method of claim 10, wherein the metal strip has a cross section selected from the group consisting of U-shape, V-shape, W-shape, and combinations of at least two of the shapes.

12. The method of claim 10, wherein the borders of the neighboring turns extend in substantial parallel relationship, when viewed in radial direction.

13. The method of claim 10, wherein the borders of the neighboring turns extend in substantial perpendicular relationship to the winding axis, when viewed in radial direction.

14. The method of claim 10, wherein the reverse bending of the metal strip faces away from a contact surface of the neighboring turns.

15. The method of claim 10, wherein the borders of the neighboring turns, connected with one another, lie at an outer radius of the metal strip.

16. The method of claim 10, wherein the reverse bending defines a bending line which lies in a radially outermost extension of the metal strip.

17. The method of claim 10, wherein the joining of the adjacent borders is executed end-to-end.

18. The method of claim 17, wherein the joining of the adjacent borders is implemented by a welding seam.

19. The method of claim 18, wherein a center of the welding seam is distanced from an outer diameter and from an inner diameter of the reverse bent border in radial direction by at least substantially 0.5 mm.

20. The method of claim 18, wherein a center of the welding seam is distanced from an outer diameter and from an inner diameter of the reverse bent border in radial direction by at least substantially 1 mm.

* * * * *

UNITED STATES PATENT AND TRADEMARK OFFICE
CERTIFICATE OF CORRECTION

| | | |
|---|---|---|
| PATENT NO. | : 9,291,263 B2 | Page 1 of 1 |
| APPLICATION NO. | : 13/302488 | |
| DATED | : March 22, 2016 | |
| INVENTOR(S) | : Weiss et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this
Twenty-sixth Day of July, 2016

Michelle K. Lee
*Director of the United States Patent and Trademark Office*